US008209039B2

(12) United States Patent
Davis et al.

(10) Patent No.: US 8,209,039 B2
(45) Date of Patent: Jun. 26, 2012

(54) PROCESS CONTROL SYSTEM HAVING ON-LINE AND OFF-LINE TEST CALCULATION FOR INDUSTRIAL PROCESS TRANSMITTERS

(75) Inventors: Dale Scott Davis, Prior Lake, MN (US); David Eugene Wiklund, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 302 days.

(21) Appl. No.: 12/570,971

(22) Filed: Sep. 30, 2009

(65) Prior Publication Data

US 2010/0082122 A1    Apr. 1, 2010

Related U.S. Application Data

(60) Provisional application No. 61/101,744, filed on Oct. 1, 2008.

(51) Int. Cl.
*G05B 13/04* (2006.01)
*G06F 17/10* (2006.01)

(52) U.S. Cl. ............................................. 700/30; 703/2

(58) Field of Classification Search ........................ None
See application file for complete search history.

(56) References Cited

U.S. PATENT DOCUMENTS

| | | | |
|---|---|---|---|
| 4,528,855 A | 7/1985 | Singh | |
| 4,949,581 A | 8/1990 | Rud, Jr. | |
| 5,101,436 A * | 3/1992 | DeAguiar et al. | 382/241 |
| 5,495,769 A | 3/1996 | Broden et al. | |
| 5,899,962 A | 5/1999 | Louwagie et al. | |
| 6,182,019 B1 | 1/2001 | Wiklund | |
| 6,643,610 B1 | 11/2003 | Kleven et al. | |
| 7,373,283 B2 * | 5/2008 | Herzog et al. | 703/2 |

(Continued)

FOREIGN PATENT DOCUMENTS

DE    9109176    10/1991

(Continued)

OTHER PUBLICATIONS

Exerpt from Orifice Meter Calculation Theory for AGA Report #3—1995, downloaded from: http://xivix.ca/AGA_ALL/AGA/ENG/AGA3.htm.*

(Continued)

*Primary Examiner* — Kakali Chaki
*Assistant Examiner* — Walter Hanchak
(74) *Attorney, Agent, or Firm* — Kinney & Lange, P.A.

(57) ABSTRACT

Methods and systems for assessing transmitter electronics in an industrial process control system comprise generating a process condition reference equation signal, a process condition approximation equation signal, and an accuracy output signal. The process condition reference equation signal is generated using a process condition reference equation and process control inputs. The process condition approximation equation signal is generated using a process condition approximation equation that approximates the reference equation using the process control inputs, and approximation equation coefficients based on the approximation equation and the process control inputs. The approximation equation signal is compared to the reference equation signal at a control room workstation such that the industrial process control system can be adjusted. In one embodiment, the approximation equation coefficients are adjusted and transmitted to process transmitter electronics over a control network. In another embodiment, a parameter of the industrial process control system, such as a primary element or transmitter, is adjusted.

33 Claims, 3 Drawing Sheets

U.S. PATENT DOCUMENTS

| | | | |
|---|---|---|---|
| 7,539,597 B2 * | 5/2009 | Wegerich et al. | 702/185 |
| 7,640,145 B2 * | 12/2009 | Wegerich et al. | 703/2 |
| 2003/0109951 A1 | 6/2003 | Hsiung et al. | |
| 2003/0144746 A1 | 7/2003 | Hsiung et al. | |
| 2005/0000289 A1 | 1/2005 | Gysling et al. | |
| 2006/0069455 A1 | 3/2006 | Longsdorf et al. | |
| 2008/0156090 A1 | 7/2008 | Wehrs | |

FOREIGN PATENT DOCUMENTS

| | | |
|---|---|---|
| EP | 0 214 801 A1 | 3/1987 |
| EP | 0 223 300 A2 | 5/1987 |
| WO | WO 91-05293 A1 | 4/1991 |
| WO | WO9118266 A1 | 11/1991 |
| WO | WO 95/08758 A1 | 3/1995 |

OTHER PUBLICATIONS

International Search Report and Written Opinion for PCT/US2009/005384.

* cited by examiner

PROCESS CONTROL SYSTEM HAVING ON-LINE AND OFF-LINE TEST CALCULATION FOR INDUSTRIAL PROCESS TRANSMITTERS

CROSS-REFERENCE TO RELATED APPLICATION(S)

This application claims priority under 35 U.S.C. §119 to U.S. provisional application Ser. No. 61/101,744, entitled "OFF-LINE AND ON-LINE TEST CALCULATION FOR MULTIVARIABLE TRANSMITTERS," filed Oct. 1, 2008 by Dale Davis and David Wiklund.

BACKGROUND

This invention relates generally to industrial process control systems having process instruments. More particularly, the present invention relates to industrial process control systems having systems and methods for performing diagnostic evaluations of computational output generated by process control instruments.

Process instruments are used to monitor process variables, such as pressure, temperature, flow and level, of process fluids used in industrial processes. For example, process transmitters are typically employed in industrial manufacturing facilities at multiple locations to monitor a variety of process variables along various production lines. Process transmitters include sensors that produce an electrical output in response to physical changes in the process. For example, pressure transmitters include pressure transducers that produce an electrical output as a function of the pressure of a process fluid, such as in water lines, chemical tanks or the like. Each process transmitter also includes transmitter electronics for receiving and processing the electrical output of the sensor so that the transmitter and process can be monitored locally or remotely. Locally monitored transmitters include displays, such as LCD screens, that show the electrical output at the site of the process transmitter. Remotely monitored transmitters include electronics that transmit the electrical output over a control loop or network to a central monitoring location such as a control room. Configured as such, the process can be regulated from the control room by including automated switches, valves, pumps and other similar components in the process control system and the control loop.

Transmitter electronics also include computational software and hardware such that the magnitude of the sensed process variable can be used to determine a process condition, such as the mass flow rate of the process fluid. As such, transmitter electronics typically include software that performs a computational analysis of the sensed process variable based on user defined process control inputs, such as the fluid type and primary element type. In order to accurately assess the process condition, full computational analysis of the process variable involves complex calculations. The hardware of the transmitter electronics is, however, typically limited in the complexity of the calculations which it can execute. For example, typical process transmitters operate with a very limited power supply, such as what is available from a 4-20 mA system. As such, processors provided within the transmitter electronics typically have fairly low clock speeds, such as 490 kHz, to reduce power demands. It is, therefore, necessary to reduce the complexity of the calculations which the transmitter processors perform so that, for example, computed results can be obtained in a reasonable amount of time. For example, the complex equations are often replaced with more basic algorithm-based calculations, as is explained in greater detail in U.S. Pat. No. 6,182,019 to Wiklund and assigned to Rosemount Inc., Eden Prairie, Minn. The computational analysis performed by the transmitter electronics is typically received at a control room via a control loop with which the process transmitters is on-line. Subsequent evaluation of the algorithm-based computational analysis performed by the transmitter electronics requires user analysis, which typically involves manual computations of the complex equations and the algorithms. There is a need for more expediently evaluating accuracy of process conditions calculated by process transmitter electronics.

SUMMARY

The present invention is directed to methods and systems for assessing accuracy of transmitter electronics in a system for controlling an industrial process. The methods and systems comprise generating a process condition reference equation signal, a process condition approximation equation signal, and an accuracy output signal. The process condition reference equation signal is generated using a process condition reference equation and process control inputs. The process condition approximation equation signal is generated using a process condition approximation equation that approximates the reference equation using the process control inputs, and approximation equation coefficients based on the approximation equation and the process control inputs. The process condition approximation equation signal is compared to the process condition reference equation signal at a control room workstation such that the industrial process control system can be adjusted. In one embodiment, the approximation equation coefficients are adjusted to reduce the difference between the process condition approximation equation signal and the process condition reference equation signal. In another embodiment, the approximation equation coefficients are adjusted and transmitted to process transmitter electronics over a control network. In yet another embodiment, a parameter of the industrial process control system, such as a hardware parameter or a process fluid parameter, is adjusted.

DETAILED DESCRIPTION

Figure 1:
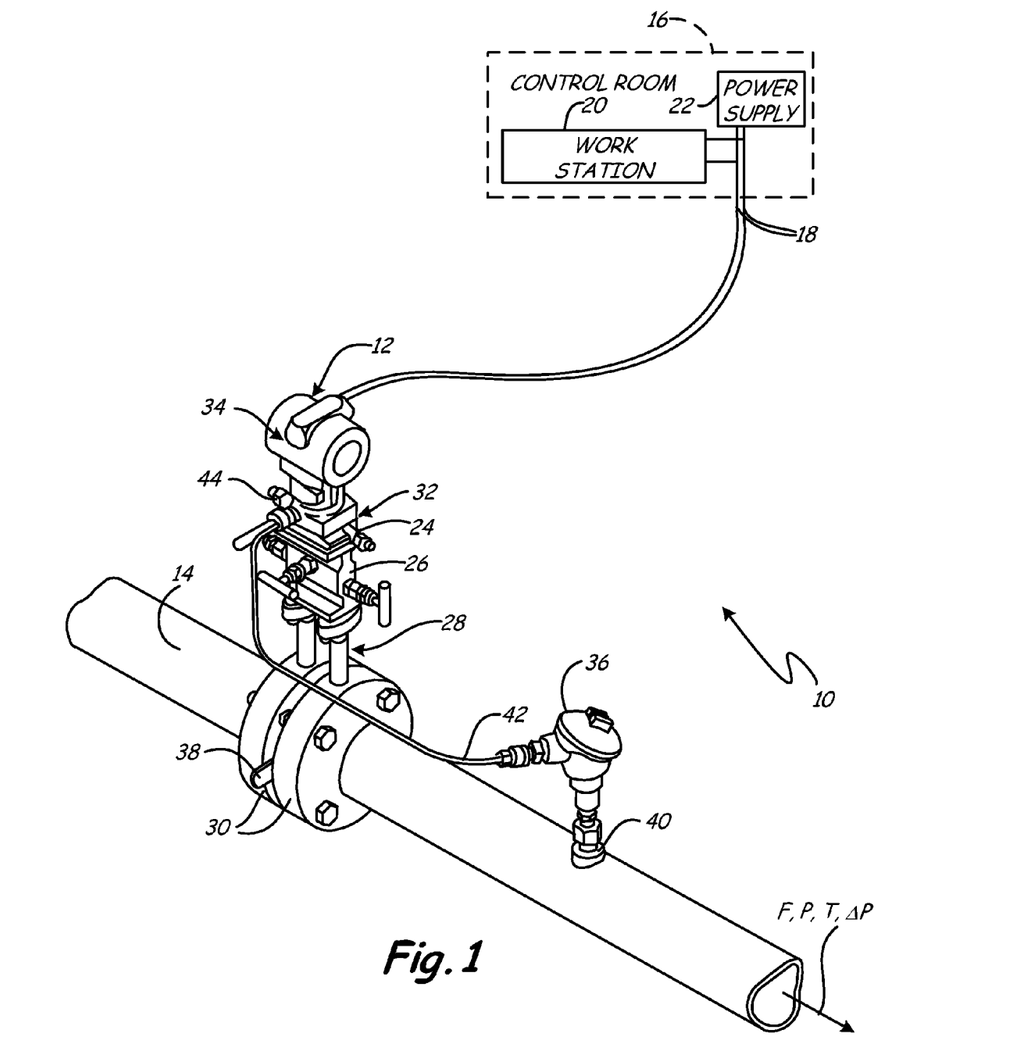
FIG. 1 shows a process control system having a process transmitter connected to a process fluid source and a control room.

FIG. 1 shows process control system 10 of the present invention having multi-variable process transmitter 12. Although described using a process pressure transmitter, the invention is applicable to all field mounted process devices such as temperature, flow, and level transmitters. Process control system 10 includes process transmitter 12, piping 14, control room 16 and control loop 18. Control room 16 includes workstation 20 and power supply 22. Process transmitter 12 is connected to a process source, such as piping 14, to generate a signal relating to process variables of process fluid F, such as temperature T, static pressure P and differential pressure ΔP. Transmitter 12 communicates the magnitude of those variables to control room 16 over control loop 18. Transmitter 12 and control room 12 comprise a system for controlling an industrial process. Controlling of an industrial process includes both passive and active control of the process. For example, control of an industrial process includes monitoring of process variables and other conditions such that decisions to control or manipulate the process can be evaluated and executed if needed or desired. Process transmitter 12 is also capable of performing analysis of the process variables to determine process conditions, such as volumetric, mass and energy flow rates of fluid F. Process transmitter 12, however, performs simplified routines derived from complex mathematical analysis. In the present invention, workstation 20 performs accurate evaluations of the mathematical analysis used to determine the process conditions such that process transmitter 12 can be evaluated in an on-line mode and an off-line mode. In an on-line mode, actual run-time calculation output of transmitter 12 is compared to output of workstation 20. As such, the simplified routines performed by transmitter 12 can be directly compared to the analysis performed by workstation 20. In an off-line mode, control room mimics the simplified routines performed by transmitter 12 to generate emulated run-time calculations that are compared to output of workstation 20. As such, the simplified routines that will be performed by transmitter 12 can be compared to the analysis performed by control room 16 ahead of configuring process control system 10. As such, the performance of process control system 10 can be configured and evaluated before or after being put on-line with transmitter 12.

In the embodiment shown, process transmitter 12 is coupled to piping 14, through which process fluid F flows, using coplanar process flange 24, manifold 26, impulse piping 28 and pipe fittings 30. Process transmitter 12 includes sensor module 32, transmitter circuitry module 34 and temperature sensor module 36. In one embodiment, process transmitter 12 comprises a multivariable transmitter as is described in U.S. Pat. No. 5,495,769 to Broden et al. and assigned to Rosemount Inc., Eden Prairie, Minn., which is incorporated by this reference. In another embodiment, process transmitter 12 comprises a 3051SMV Multivariable Transmitter as is commercially available from Rosemount Inc., Eden Prairie, Minn. Process flange 24, which adapts pressure sensor module 32 for coupling with the process control system 10, connects transmitter 12 to manifold 26, which allows transmitter 12 to be isolated from process fluid F for calibration, testing, and maintenance, etc. Manifold 26 connects to impulse piping 28, which provides two interfaces with process fluid F for determining differential pressure measurements. Impulse piping 28 connects to piping 14 at pipe fittings 30. Between pipe fittings 30 is disposed primary element 38 that produces a pressure differential within the flow of process fluid F within piping 14. Temperature sensor module 36 is connected to piping 14 through thermowell 40, and to sensor module 28 through conduit 42, which enters sensor module 32 at boss 44.

Differential pressure ΔP is produced within the flow of process fluid F by primary element 38, which in the embodiment shown comprises an orifice plate. The orifice plate includes a bore having a diameter smaller than that of piping 14 to produce a flow restriction. Impulse piping 30 straddles the primary element 38 such that interfaces with process fluid F at relatively higher and lower pressures are communicated through manifold 26 and flange 24 to sensor module 32. Sensor module 32 includes both a differential pressure sensor and an absolute or gage pressure sensor for sensing differential pressure ΔP across primary element 38 and static pressure P in process fluid F, respectively. In one embodiment, the differential pressure sensor comprises a capacitance-based pressure sensor cell and the absolute or gage pressure sensor comprises a piezoresistive strain gauge. Temperature sensor module 36, which in one embodiment comprises a resistive temperature device (RTD), senses temperature T within piping 14 at thermowell 40. Output of temperature sensor module 36 is transmitted through conduit 42 to sensor module 32. Sensor module 32 generates electrical signals based on output from the differential and gauge pressure sensors and temperature sensor module 36, and transmits the signals to transmitter circuitry module 34.

Transmitter circuitry module 34 includes electrical components for transmitting the electrical signals over control loop 18 to workstation 20 or a local display, such as an LCD screen, or both. In one embodiment, process transmitter 12 communicates with control room 16 over a wireless network. In other embodiments, process transmitter 12 is a two-wire transmitter for operating on a 4-20 mA loop. In such an embodiment, control loop 18 includes a pair of wires for supplying power to process transmitter 12 from power supply 22. Control loop 18 also enables control room 16 to transmit data to and receive data from process transmitter 12 utilizing workstation 20. Typically, a 4 mA DC current provides sufficient energy for operating the sensor and transmitter circuitry of process transmitter 12 and any local display.

Transmitter circuitry module 34 and workstation 20 are also configured to perform computational analysis of the electrical signals generated by the pressure sensors and temperature sensor module 36 to determine process conditions. For example, the flow through primary element 38 can be calculated based on various process control inputs. The process control inputs include hardware parameters, such as the geometry of primary element 38, process fluid parameters, such as viscosity μ and density ρ of fluid F, and process variables, such as T, P and ΔP. Thus, the flow of fluid through pipe 14 is a function of primary element 28, process fluid F and the process variables pressure P and temperature T. The process control inputs are related in various process condition equations to determine mass flow rate $Q_m$, volumetric flow rate $Q_v$ and energy flow rate $Q_E$. For example, mass flow rate $Q_m$ is determined by evaluating process condition Equation [1].

$$Q_m = N C_d Y_1 E d^2 \sqrt{\rho} \sqrt{\Delta P} \qquad \text{Equation [1]}$$

$Q_m$=mass flow rate (mass/unit time).
N=units conversion factor (units vary).
$C_d$=discharge coefficient (dimensionless).
$Y_1$=gas expansion factor (dimensionless).
E=velocity of approach factor (dimensionless).
d=primary element throat diameter (length).
ρ=fluid density (mass/unit volume).
ΔP=differential pressure (force/unit area).

Equation [1] is comprised of a plurality of components that account for different process control inputs of process control system 10. For example, N is a constant value that accounts for desired units of measure for the process variables and process conditions, d is a hardware parameter that accounts for dimensions of the primary element, and ΔP is a process variable that accounts for differential pressure within system 10, such as can be determined using sensor module 32 of transmitter 12. Equation [1] also includes a plurality of components that represent various reference equations. For example, $C_d$, $Y_1$, $Ed^2$ and $\sqrt{\rho}$ are determined by evaluating reference equations. The reference equations comprise well known equations that can be found in American Gas Associations (AGA) publications or other sources including national and international standards, textbooks and proprietary information from manufacturers for use with commonly used fluids and primary elements. Each of $C_d$, $Y_1$, $Ed^2$ and $\sqrt{\rho}$ can be determined by a plurality of different reference equations, which depend on process variables T and P. In other embodiments, reference equation can be generated by workstation 20 in control room 18 for lesser used fluids. For example, workstation 20 may include software that performs interpolation methods to model behavior of custom fluids or custom primary elements based on empirical and theoretical data. Typical reference equations include complex calculations, such as logarithms and exponentials.

The mass flow rate $Q_m$ of Equation [1] is made up of empirical and theoretical components. Evaluation of each component of Equation [1] affects the accuracy of the magnitude of the mass flow rate $Q_m$. For example, the fluid density $\rho$ is an empirical term derived from experimental data and represents a complex polynomial that is dependent on T and P. Any errors or inaccuracies that arise in determining density $\rho$ are multiplied throughout the evaluation of Equation [1]. Similarly, errors or inaccuracies that arise in determining the other terms in Equation [1] affect the accuracy of Equation [1]. Thus, it is desirable to evaluate all of the terms in Equation [1] as accurately as possible. Complete evaluation of Equation [1] requires computations that are advantageously executed with processors having high clock speeds and large memories to complete the evaluation in a reasonable amount of time and to a large number of decimal places, but that require large power supplies. In the present invention, workstation 20 evaluates process condition equations, such as Equation [1], to evaluate a process condition, such as $Q_m$, to very accurate levels using process variables temperature T, pressure P and differential pressure $\Delta P$, hardware parameters and process fluid parameters, which can be provided either from a user or from transmitter 12.

It is, however, also desirable for transmitter 12 to be able to determine process conditions independent of control room 16. It is not always desirable to have workstation 20 computing process conditions. For example, the accuracy to which workstation 20 is able to calculate the process conditions is not always needed. Also, it is often desirable to have the processing power of workstation 20 available for performing other tasks related to controlling system 10. Transmitter 12, however, does not typically include processing capabilities for fully evaluating Equation [1]. Process transmitters are typically equipped with slower processors as compared to more powerful computers that can be provided at control room 16 where power supply is not an issue. As such, Equation [1] can be simplified, as is discussed in the aforementioned U.S. Pat. No. 6,182,019 to Wiklund, which is incorporated by this reference. For example, the complex equations can be simplified using interpolating functions, such as Chebychev polynomial approximations, or curve fitting techniques. The resulting approximations can be evaluated using simpler calculations, such as addition, subtraction, multiplication and division. Equation [1] can be simplified by converting each reference equation into an approximation of the complex polynomial defining the reference equation, as shown in Equation [2], wherein the bracketed terms represent various approximations.

$$Q_m = N[C_d][Y_1][Ed^2][\sqrt{\rho}]\sqrt{\Delta P} \quad \text{Equation [2]}$$

Each approximation is made up of a plurality of terms that depend on various process control inputs, such as the process variables, the hardware parameters and the process fluid parameters. Furthermore, each approximation depends on a plurality of coefficients, which dependent on the specific type of approximation used and the process variables. The number of coefficients for each reference equation approximation depends on the degree of the polynomial for the underlying reference equation. For example, in Equation [1], the terms E and $d^2$ are combined into a single conventional polynomial expression that depends on T and a number of coefficients. If the interpolating function that determines the approximation equation is a second degree polynomial, the number of coefficients is two. If the interpolating function is a third degree polynomial, the number of coefficients is three. Thus, the coefficients vary depending on the expected operating ranges of P and T, and the type of interpolation used to approximate the reference equation. The coefficients must be provided to transmitter 12 in order to evaluate the approximations.

As an example, the discharge coefficient $C_d$ can be approximated by Equation [3], wherein $R_D$ is the Reynolds number of primary element 38.

$$[C_d] = \sum_{i=0}^{b} a_i \left(\frac{1}{\sqrt{R_D}}\right)^i \quad \text{[Equation 3]}$$

The Reynolds number $R_D$ depends on hardware parameters, such as primary element throat diameter d, and process fluid parameters, such as viscosity $\mu$ and density $\rho$ of fluid F. Viscosity $\mu$ and density $\rho$ each require coefficients to be evaluated at specific temperatures and pressures. Equation [3] is evaluated, such as with a curve fitting technique, to determine a value for $C_d$ and process variable-specific coefficients that can be put into algorithms easily evaluated by transmitter electronics. Other terms from Equation [1], such as the gas expansion factor $Y_1$, can also be represented as approximations derived from curve fitting techniques or interpolations. Thus, Equation [2] can be evaluated by putting the process variable inputs through simplified algorithms, rather than through complex calculations, as is required of Equation [1].

Transmitter 12 is provided with the algorithm equations, as well as the coefficients, for approximating the terms in Equation [2], such as $[C_d]$, that can be used to more rapidly calculate $Q_m$. Transmitter 12 is hard-coded with the algorithm equations that evaluate the approximations. Thus, transmitters can be reconfigured with different coefficients depending on the base reference equations and approximations used. Workstation 20 determines the coefficients that must be used with the algorithm equations for the given reference equations based on process control inputs for expected operating ranges of T and P for transmitter 12 determined by an operator based on expected operating conditions for system 10. The coefficients are transmitted to transmitter 12 and are stored within the electronics of transmitter 12 in lookup tables. For given process variables temperature T, pressure P and differential pressure $\Delta P$ that are sensed, appropriate coefficients for evaluating the approximation of the terms in Equation [2] can be retrieved. Thus, transmitter 12 can evaluate process conditions, such as $Q_m$, rapidly and to acceptable accuracy levels without requiring workstation 20 to evaluate complex process condition reference equations.

Thus, the present invention allows for evaluation of the process conditions in an off-line mode and an on-line mode using both real-time and simulated data. In the off-line mode, workstation 20 evaluates Equation [1] and Equation [2] to determine the accuracy of potential output of transmitter 12. In the on-line mode, transmitter 12 evaluates Equation [2] and workstation 20 evaluates Equation [1] to determine the accuracy of actual output of transmitter 12. In both the off-line and online modes, Equations [1] and [2] can be evaluated using purely simulated data entered at workstation 20, or can use a combination of real-time data generated by transmitter 12 and simulated data entered at workstation 20.

Evaluation of Equation [2] can be used to make adjustments to process control system 10, such as by adjusting the coefficients used to evaluate Equation [2]. For example, fluid F may be running outside of expected operating conditions or ranges of T and P such that the values for the coefficients stored in the lookup tables do not yield accurate process condition results. In particular, the fluid density, [$\sqrt{\rho}$], is particularly difficult to solve for, given the physical changes to which process fluid F is subject. The present invention provides a method and system for evaluating process condition calculations determined by process transmitter 12 and for providing adjusted coefficients to process transmitter 12 such that more accurate results can be obtained. Alternatively, the reference equations used to generate the coefficients for use in Equation [2], which are hard-coded into transmitter 12, may be inadequate. In such a case, different reference equations may be substituted.

Figure 2:
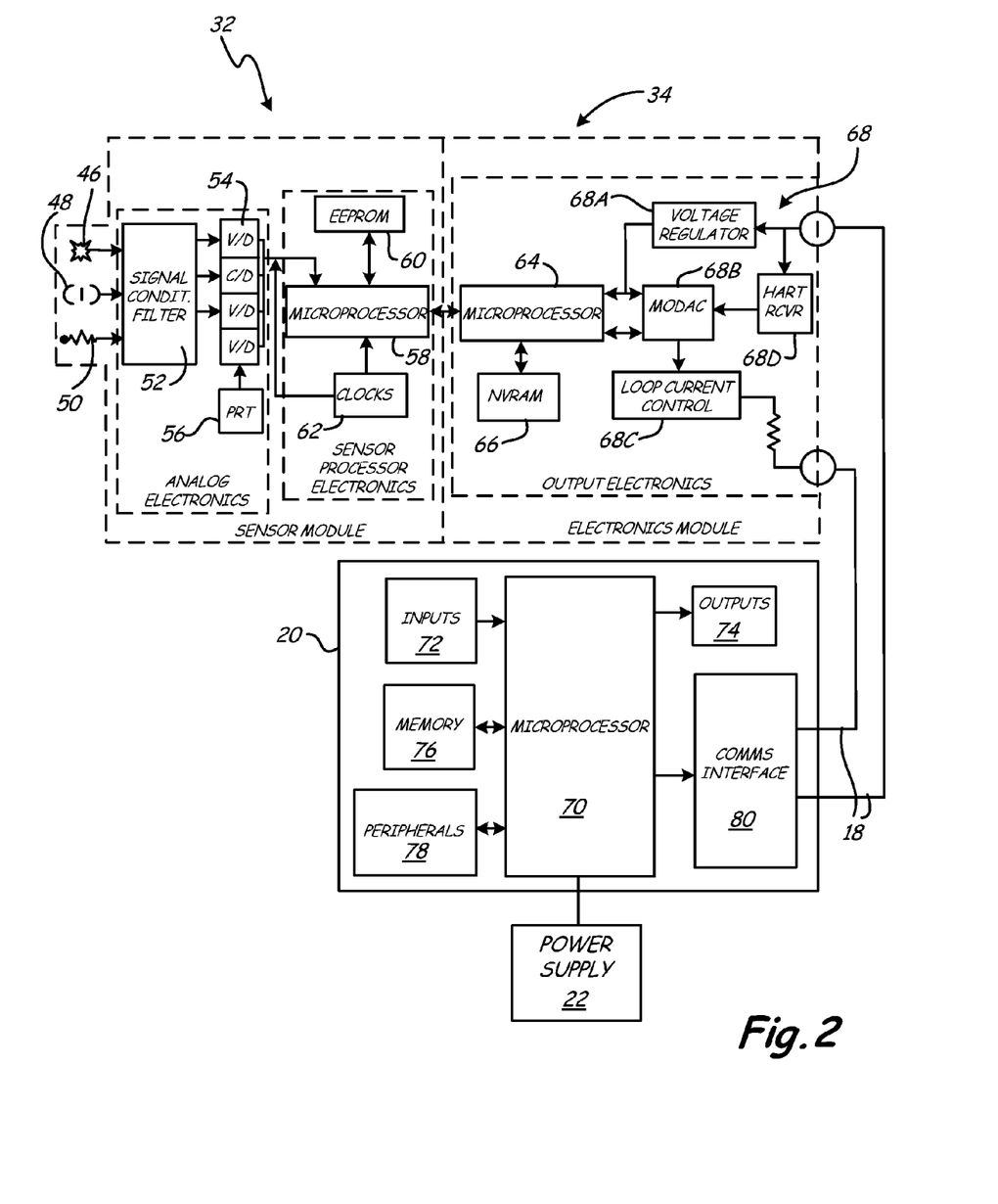
FIG. 2 shows a circuit diagram of process transmitter electronics and control room electronics of the process control system of FIG. 1.

FIG. 2 shows a circuit diagram of process transmitter sensor module 32 and process transmitter circuitry module 34 of transmitter 12, and workstation 20 of control room 16 of FIG. 1. Transmitter sensor module 32 includes strain gauge pressure sensor 46, differential pressure sensor 48, temperature sensor 50, analog electronics and sensor processor electronics. Transmitter circuitry module 34 includes output electronics. Analog electronics include conditioning circuitry 52, converter circuitry 54 and platinum resistance thermometer (PRT) 56. Sensor processor electronics include sensor microprocessor 58, memory 60 and clock 62. Output electronics include output microprocessor 64, memory 66, and communication circuitry 68. Workstation 20 includes microprocessor 70, inputs 72, outputs 74, memory 76, peripherals 78 and communications interface 80.

Strain gauge pressure sensor 46 senses the line or static pressure P of fluid F in piping 14 (FIG. 1). Differential pressure sensor 48, which typically comprises a capacitance-based differential pressure sensor, senses the differential pressure ΔP across primary element 38 within piping 14 (FIG. 1). Temperature sensor 50, which typically comprises a resistive temperature device (RTD), senses the process temperature T of fluid F in piping 14 (FIG. 1). Analog output from sensors 46, 48 and 50 are transmitted to conditioning circuitry 52, which amplifies and conditions (e.g. filters) the signals. Converter circuitry 54 converts the analog signals generated by sensors 46, 48 and 50 to digital signals usable by microprocessor 58. As shown in FIG. 2, converter circuitry includes both voltage-to-digital (V/D) and capacitance-to-digital (C/D) converters. PRT 56 provides a temperature signal to converter circuitry 54 indicative of the temperature near pressure sensors 46 and 48 so that the differential and gauge pressure signals can be compensated for temperature variations. Microprocessor 58 receives digitized and conditioned sensor signals from converter circuitry 54. Microprocessor 58 compensates and linearizes the sensor signals for sensor-specific errors and non-linearity using correction constants stored in memory 60. Clock 62 provides microprocessor 58 with clock signals. Digitized, compensated and corrected sensor signals are then transmitted to microprocessor 64.

Microprocessor 64 analyzes the sensor signals to determine a process condition of fluid F. In particular, memory 66 (which may be non-volatile random access memory (NVRM)) includes lookup tables in which are stored algorithm coefficients which are used to determine particular values of process fluid conditions, such as $Q_m$, based on the magnitude of the sensed process variables T, P and ΔP. Additionally, hardware parameters and process fluid parameters, such as the type and the bore diameter d of primary element 38 and the viscosity μ and density ρ of process fluid F, are uploaded into memory 66 through control loop 18. In other embodiments, data relating to hardware parameters and fluid parameters are directly entered into transmitter 12 through a user interface (not indicated in FIG. 2). Furthermore, process fluid parameters may be a function of the process variables such that various process fluid parameters are stored in the lookup tables and selected based on other fluid parameters and the sensed process variables.

Using hardware parameters, process fluid parameters, sensed process variables, and algorithm coefficients, microprocessor 64 performs a run-time calculation. The run-time calculation evaluates a process condition approximation equation, such as Equation [2], to determine a process condition of fluid F, such as the mass flow rate $Q_m$. A process condition approximation signal representing the calculated process condition and the sensor signals are transmitted to workstation 20 over control loop 18 using communication circuitry 68. Communication circuitry 68 includes voltage regulator 68A, modulator circuitry 68B, loop current controller 68C and a protocol receiver, such as a 4-20 mA HART® receiver or transceiver 68D, to enable transmitter circuitry module 34 to communicate with communication interface 80 of workstation 20 at control room 16. Further explanation of the operations of transmitter sensor module 32 and transmitter circuitry module 34 is found in the aforementioned patents to Wiklund and Broden et al.

Workstation 20 is disposed within control room 16 and connected to power supply 22. Workstation 20 typically comprises a personal computer, such as a portable computer, installed near an industrial process to monitor and regulate process variables and process conditions of the industrial process. Workstation 20 includes inputs 72, such a keyboard, mouse, or other user interface, that enable operators to input process control inputs into memory 76. Workstation 74 also includes outputs 74, such as a monitor, which enable data to be extracted from workstation 74. Peripherals 78, such as a printer or other commonly used devices, can also be connected to workstation 20 to input and extract data from microprocessor 70. Workstation 20 includes communications interface 80, which transmits data to and receives data from microprocessor 64.

Workstation 20 is configured to provide complete evaluation and analysis of capabilities of transmitter electronics module 34 and sensor signals generated by an absolute or gage pressure sensor 46, differential pressure sensor 48 and temperature sensor 50 of transmitter sensor module 32 with or without being connected to transmitter 12. Using software routines stored in memory 76, microprocessor 70 is capable of executing commands that evaluate Equations [1]-[3] based on process control inputs entered into workstation 20 by a system user and/or process control inputs received from transmitter 12.

In an on-line testing mode, simulated pressure and temperature sensor data, such as T, P and ΔP, is communicated to memory 66 of transmitter 12 from workstation 20 using control loop 18. Also, a system user enters hardware parameters, such as the dimensions of primary element 38, and process fluid parameters, such as the density ρ and viscosity μ of F, into memory 76 using inputs 72. The hardware parameters and process fluid parameters are transmitted to memory 66 using control loop 18. As such, microprocessor 64 includes information to determine a process condition, such as mass flow rate $Q_m$, using simulated data. Microprocessor 64 performs the run-time calculations and determines the process condition using Equation [2] such that the process condition is determined as accurately as can be using microprocessor 64 and any necessary information from the lookup tables. Communication circuitry 68 transmits a process condition approximation signal to microprocessor 70. Microprocessor 70 evaluates Equation [1] using the simulated sensor data, the hardware parameters and the process fluid parameters to generate a process condition reference equation signal. As such, the performance of transmitter 12 can be evaluated by comparing the process condition reference equation signal to the process condition approximation signal. Adjustments to transmitter 12 or process control system 10 can then be made as needed. For example, primary element 38 can be changed out, or the algorithm coefficients, such those used to determine $[C_d]$ based on expected ranges of T and P, stored in memory 66 can be adjusted. As such, workstation 20 can perform an evaluation of the accuracy of output from transmitter 12 and uses the evaluation to adjust system 10. In such an on-line mode, process control system 10 is set to control the industrial process manually, rather than automatically based on output from transmitter 12. As such, the industrial process is managed using real data rather than simulated data to avoid false alarm conditions and unwarranted corrective measures.

The on-line mode can also be run to evaluate transmitter 12 in real-time using actual sensor data. A system user enters hardware parameters and process fluid parameters into memory 76 using inputs 72, which are then communicated to memory 66 using control loop 18. Actual process variable data relating to T, P and ΔP generated by transmitter 12 is communicated to workstation 20 via control loop 18 and stored in memory 76. Additionally, microprocessor 70 receives a process condition approximation signal from transmitter 12, which indicates the value of the process condition as determined by transmitter electronics microprocessor 64 performing the run-time calculations. Microprocessor thus 70 includes information to determine a process condition, such as mass flow rate $Q_m$, using real time data. Microprocessor also 70 determines the process condition using Equation [1] such that the process condition is determined as accurately as can be using microprocessor 70 and any necessary interpolations. As such, the run-time calculations performed by transmitter 12 can be evaluated and adjustments to transmitter 12 or process control system 10 can be made as needed.

In an off-line mode, a system user enters hardware parameters, process fluid parameters and simulated process variables into memory 76 using inputs 72. As such, a system user can determine in advance of setting up a process control system how accurately a given process condition can be evaluated by both a control room computer and a process transmitter without actually putting a control system and transmitter on-line. This saves time in connecting transmitter 12 to control room 16, and in having to send configuration data to transmitter 12. Using the entered process control inputs, microprocessor 70 evaluates Equation [1] to generate a process condition reference equation signal that represents an accurate measure of the process condition. Additionally, using the entered process control inputs, microprocessor 70 performs various mathematical operations to determine the algorithm coefficients used to evaluate Equation [2]. For example, microprocessor 70 uses a curve fitting technique to evaluate Equation [3] such that $[C_d]$ can be evaluated. Using the algorithm coefficients, microprocessor 70 performs emulated run-time calculations to evaluate Equation [2] and generate a process condition approximation signal. Thus, the process condition reference equation signal generated from Equation [1] can be compared to the process condition approximation signal generated from Equation [2] so that subsequent adjustments to the hardware parameters, the process fluid parameters, the approximation equations or the coefficient lookup tables can be made, if necessary, before system 10 or transmitter 12 is configured and put on-line.

Figure 3:
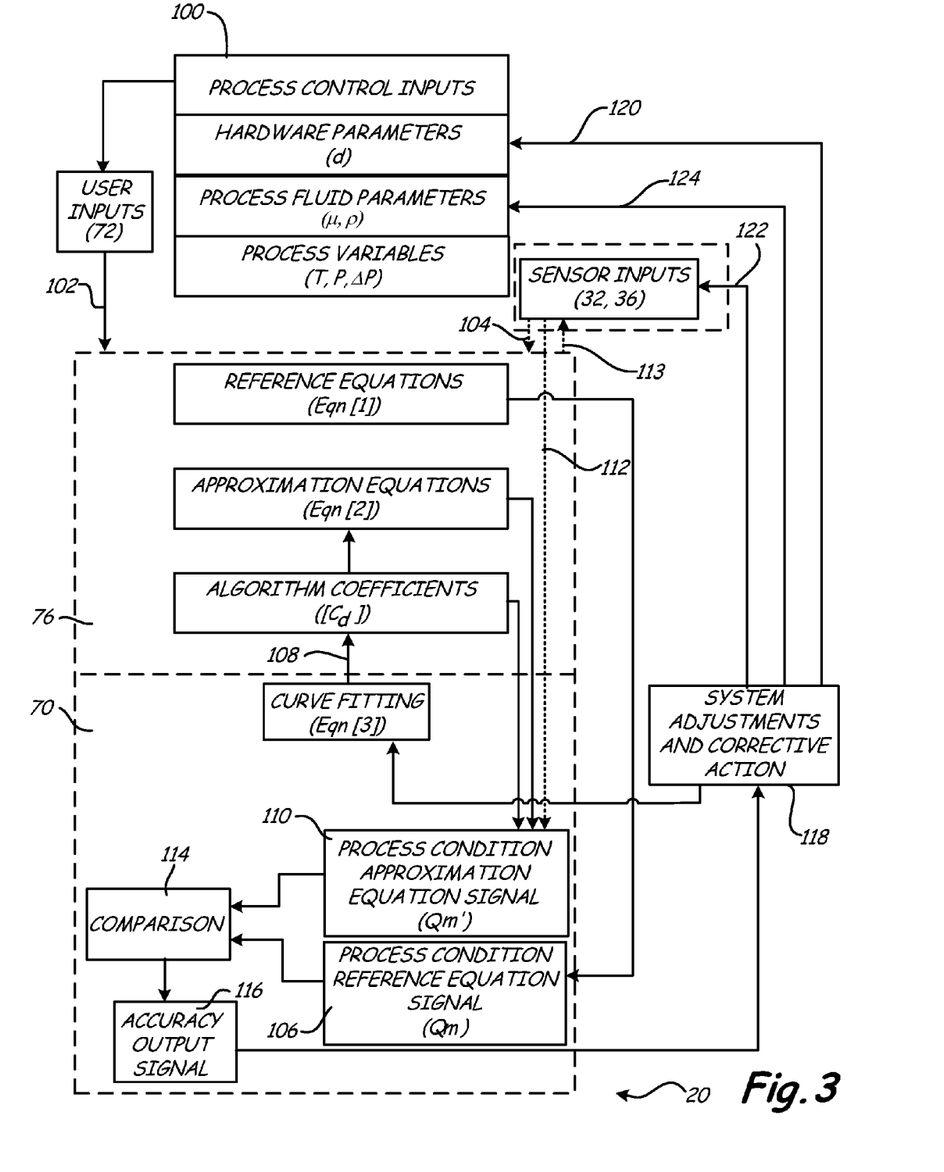
FIG. 3 shows a flow chart diagramming a feedback loop between the process control system of FIG. 1 and the control room electronics of FIG. 2 for assessing the accuracy of the process transmitter electronics and making adjustments to the process control system.

FIG. 3 shows a flow chart diagramming a feedback loop between process control system 10 of FIG. 1 and control room workstation 20 of FIG. 2 for assessing the accuracy of process transmitter circuitry 64 of FIG. 2 and making adjustments to process control system 10. Output from workstation 20 can be used to configure and adjust various components of process control system 10 after performing an assessment of run-time calculations that are typically performed by process transmitter 12. For example, when transmitter 12 is on-line with workstation 20, microprocessor 70 is able to evaluate output of transmitter 12 with output of microprocessor 70 to determine the accuracy of the output of transmitter 12. However, by simulating the run-time calculations to generate emulated run-time calculations at workstation 20, the performance of transmitter 12 can be evaluated when transmitter 12 is off-line.

At step 100, process control inputs for a given process control system are selected. For example, the process fluid parameters (such as viscosity μ and density ρ of process fluid F) that will be controlled with system 10 are selected. Next, the desired hardware parameters of system 10 (such as bore diameter d of primary element 38 or the range of the differential pressure sensor used in transmitter 12) are selected based on process fluid F to be used in system 10 and the expected operating range of the industrial process. Additionally, simulated process variables (such as T, P and ΔP) are selected to approximate conditions under which system 10 will operate. Once selected, process control inputs are entered into memory 76 of workstation 20 using user inputs 72, as shown at step 102. A user can manually enter the inputs upon prompting using software residing in workstation 20, or workstation 20 can upload data from a file stored in memory 76 containing predetermined test parameters. As such, microprocessor 70 is provided with data for performing emulated run-time calculations to conduct an off-line evaluation of transmitter 12. Alternatively, as shown in dotted lines at step 104, memory 76 can be provided with actual process variable data from transmitter 12 in lieu of simulated data from user inputs 72 such that evaluation of real-time data from transmitter 12 can be performed.

At step 106, microprocessor 70 uses process control input data provided to memory 76 to evaluate the process condition equation and generate a process condition reference equation signal. The process condition equation, e.g. Equation [1], is evaluated to determine a process condition such as mass flow rate $Q_m$ of the process fluid F. Microprocessor 70 uses full, double precision integer arithmetic such that an accurate assessment of the mass flow rate $Q_m$ can be determined. Workstation 20 is connected to independent power supply 22 (FIG. 2) such that microprocessor 70 can be configured to operate as needed to rapidly evaluate calculations. At step 108, microprocessor 70 uses the process control inputs to determine algorithm coefficients and the approximation equations based on the expected operating ranges of T and P. For example, the discharge coefficient $[C_d]$ is determined by using a curve fitting technique to evaluate Equation [3]. In order for Equation [3] to be evaluated, the proper set of coefficients must be generated for use by microprocessor 70 or for uploading to transmitter 12.

At step 110, microprocessor 70 uses the process control inputs provided to memory 76 by inputs 72 and the algorithm coefficients provided to memory 76 by the curve fitting to evaluate the approximation equation and generate a process condition approximation signal, thereby performing emulated run-time calculations. The approximation equation, e.g. Equation [2], is completed using the algorithm coefficients and evaluated using the process control inputs to determine a process condition such as mass flow rate Qm' of process of fluid F. Microprocessor 70 uses floating point arithmetic to evaluate the approximation equation such that the value of $Q_m$ mimics the capabilities of process transmitter electronics used in transmitter electronics module 34. For example, microprocessor 64 of transmitter 12 is configured to use only the power available from control loop 18 of FIG. 2. However, in other embodiments, microprocessor 70 can evaluate the approximation equation using double precision integer arithmetic. Alternatively, as shown dotted lines at step 112, microprocessor 70 can be provided with a process condition approximation signal generated from actual run-time calculations performed by process transmitter 12 such that evaluation of actual real-time data can be performed. In yet another embodiment, transmitter 12 generates the process condition approximation signal using process control inputs, including simulated sensor data, provided to workstation 20 by user inputs 72 and relayed to transmitter 12, as shown in step 113. Data provided to transmitter 12 at step 113 can be manually generated, such as by a user from workstation 20, or can be automatically generated such as by a test program run by microprocessor 70. As such, testing of transmitter 12 can be done on demand by a user, or as part of an automated, regularly scheduled test program.

At step 114, microprocessor 70 compares the process condition approximation signal with the process condition reference equation signal. The comparison determines if the approximation equation is yielding a magnitude of mass flow that is greater or smaller than a magnitude of the mass flow determined by the reference equations. The difference of the magnitudes is used to generate an accuracy output signal, as shown at step 116. The accuracy output signal is evaluated at step 118 to determine if adjustments or corrective action need to be taken at system 10. Workstation 20 may be configured to automatically compare the process condition signals such that no further actions from a user are necessary to obtain evaluation data. In one embodiment, the process condition approximation signal is targeted to be within +/−1% of the process condition control signal. If the difference in magnitude is within acceptable limits, it is an indication that system 10 is properly adjusted and is ready to be configured, constructed and put on-line. If the difference in magnitude of the determinations of the mass flow rate is too large, it is an indication that adjustments or corrective action needs to be taken.

A large difference in the magnitude of the calculated process conditions may indicate that the approximation equation is not providing precise results. As such, the approximation equation can be recalculated at step 118 using different reference equations or configuration parameters such as process operating ranges. Thus, the coefficients stored in the lookup tables of memory 66 and memory 76 can be changed. However, the values of the mass flow rate $Q_m$ may also indicate that the actual operating conditions of system 10 are different than what the expected operating conditions were determined to be such that adjustments to system 10 need to be made to accommodate the difference. Hardware used in system 10 may be changed out for hardware having different parameters. For example, primary element 38 may be changed from a Venturi to an orifice at step 120. Static pressure sensors are typically configured to sense pressure up to approximately 800 pounds per square inch (psi) [~5,500 kPa], or approximately 3,600 psi [~24,800 kPa]. Differential pressure sensors are typically configured to sense pressure in ranges up to approximately 25 inches of water (in H2O) [~6.2 kPa], 250 in H2O [~6.22 kPa], or 1000 in H2O [~248.6 kPa]. Thus, transmitter 12 may be substituted for a transmitter having a pressure sensor having a range suitable for use with the operating conditions of system 10, as shown at step 122.

The present invention provides advantages over previous methods for evaluating performance of process transmitters. Workstation 20 is provided with software that mimics the run-time calculations typically performed by process transmitters. Transmitters connected to workstation 20 need not be on-line and in active communication with workstation 20. Thus, workstation 20 is able to evaluate transmitter performance without being connected to a transmitter by evaluating emulated run-time calculations. As such, in embodiments where workstation 20 comprises a portable computer, performance of process control system 10 can be evaluated and demonstrated at locations away from the actual industrial process, such as in offices, at meetings or during sales presentations. Workstation 20 is also provided with software that evaluates reference equations to provide a control or baseline process condition to which the emulated transmitter computations can be compared. Thus, the need for manually generating data against which process transmitters can be evaluated is eliminated.

Workstation 20 can also automatically compare values derived for the process conditions from the reference equations and the approximation equations, from either run-time calculations or emulated run-time calculations. The end result can be compared, as well as the intermediate steps used to arrive at the process condition. For example, the mass flow rates $Q_m$ calculated from the reference equation and the approximation equation can be compared, as well as calculations for density ρ or terms such as $C_d$ and $[C_d]$. The results of the comparison can be stored in memory 76 within workstation 20. Parametric evaluations of the reference equations and the approximation equations can be done in real-time on workstation 20 to allow an operator to see the effects of changing different parameters within system 10, such as the algorithm coefficients. Thus, uncertainty associated with specific ranges of temperature T and pressure P for a given set of coefficients can be determined. Additionally, workstation 20 can display assumptions made about process control system 10 used to evaluate the reference equations and the approximation equations such that an operator can determine how such assumptions affect the uncertainty or accuracy of the approximation equations. Thus, workstation 20 can assist an operator in finding the right balance is selecting expected operating ranges of T and P and expected accuracy for sub-ranges within the expected ranges.

Tables indicating data generated using Equation [1], Equation [2] and Equation [3] for the given set of process control inputs can be generated and saved. Subsequently, using outputs 74 or peripherals 78, reports can be generated that provide users an indication of the performance of transmitter electronics module 34. The reports can be displayed locally at workstation 20, such as on a monitor, or can be published, such as with a printer, for later reference or archiving. For example, the reports could include graphical representations of the calculated process conditions and intermediate steps to facilitate user evaluation of the data. The reports can be used to make adjustments to or take corrective actions on system 10. For example, primary element 38 can be substituted for a component that performs optimally at the conditions under which system 10 is to perform. Also, the algorithm used by transmitter electronics module 34 may be adjusted, such as by swapping out transmitter 12 for a transmitter having different hard-coded approximation equations. The coefficients available in look up tables or changing the curve fitting technique may also be adjusted to adjust the process condition approximation signal generated. Additionally, the process fluid may be substituted for another. The reports may also be used to comply with industry and governmental standards. For example, workstation 20 may be configured to determine under what conditions process control system 10 or transmitter 12 will fail to comply with AGA standards.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for assessing accuracy of process condition calculations in a system for controlling an industrial process, the method comprising:
   generating, at an industrial process control workstation, a process condition reference equation signal representing a reference process condition of a process fluid using a process condition reference equation and process control inputs including simulated process variables;
   generating, at an industrial process control workstation, a process condition approximation equation that approximates the reference equation using the process control inputs; wherein the process condition approximation equation mimics a transmitter equation evaluated on an industrial process transmitter located remotely from the industrial process control workstation;
   generating approximation equation coefficients for use by the process condition approximation equation;
   generating, at the industrial process workstation, a process condition approximation equation signal representing an approximated process condition of the process fluid based on the process condition approximation equation, the process control inputs and the approximation equation coefficients; and
   comparing the process condition approximation equation signal to the process condition reference equation signal to generate an accuracy output signal that is used to adjust the system for controlling an industrial process.

2. The method of claim 1 and further comprising using the accuracy output signal to adjust configuration of the approximation equation coefficients to regenerate the process condition approximation equation signal so that the difference between the process condition approximation equation signal and the process condition reference equation signal is reduced.

3. The method of claim 2 and further comprising transmitting the adjusted approximation equation coefficients to process transmitter electronics within the industrial process transmitter over a control network connected to the industrial process workstation to reevaluate the transmitter equation.

4. The method of claim 3 wherein the adjusted approximation equation coefficients are generated while the process transmitter electronics are off-line from the control network.

5. The method of claim 4 wherein the process transmitter electronics within the industrial process transmitter generate an actual process condition signal.

6. The method of claim 5 and further comprising calculating an actual process condition based on sensed process variables, the adjusted approximation equation coefficients, and the process control inputs using the transmitter equation and the transmitter electronics within the industrial process transmitter.

7. The method of claim 1 wherein the process condition reference equation comprises:

$Q_m = NC_d Y_1 E d^2 \sqrt{\rho} \sqrt{\Delta P}$, wherein:

$Q_m$=mass flow rate (mass/unit time),
N=units conversion factor (units vary),
$C_d$=discharge coefficient (dimensionless),
$Y_1$=gas expansion factor (dimensionless),
E=velocity of approach factor (dimensionless),
d=primary element throat diameter (length),
$\rho$=fluid density (mass/unit volume), and
$\Delta P$=differential pressure (force/unit area).

8. The method of claim 7 wherein the process condition approximation equation comprises:

$Q_m = N[C_d][Y_1][Ed^2]\sqrt{\rho}\sqrt{\Delta P}$, wherein the bracketed terms comprise an approximation of a reference equation term.

9. The method of claim 8 wherein a bracketed term of the approximation equation approximates a reference equation comprising a portion of the reference equation using a curve fitting technique or an interpolating technique.

10. The method of claim 9 wherein the process condition approximation equation signal is generated using floating point arithmetic and the process condition reference equation signal is generated using integer arithmetic.

11. The method of claim 4 wherein the process transmitter electronics are powered by the control network, and the control network is selected from the group consisting of: a 4-20 mA loop, Fieldbus, Profibus and Modbus.

12. The method of claim 1 and further comprising storing in memory values for the process condition reference equation signal and the process condition approximation equation signal.

13. The method of claim 12 and further comprising generating a report comparing the process condition reference equation signal and the process condition approximation equation signal.

14. The method of claim 1 wherein the process control inputs further comprise at least one of a simulated sensed process variable, an original hardware parameter of the system, process operating range and a fluid parameter of the industrial process.

15. The method of claim 14 and further comprising replacing the original hardware parameter of the system based on the accuracy output signal with a substitute hardware parameter.

16. The method of claim 15 wherein the substitute hardware parameter of the system comprises a primary element selected from the group consisting of an orifice plate and a venturi, or an industrial process transmitter having a range different from that of the original hardware parameter.

17. A process control workstation for configuring a remote process transmitter, the workstation comprising:
   communication circuitry for communicating over a process control network;
   a user interface for entering process control inputs; and
   a microprocessor connected to the communication circuitry and the user interface to:
     evaluate a process condition reference equation using process control inputs including simulated process variables to determine a simulated process condition of a process;
     produce a process condition reference equation signal based on the process condition reference equation and the process control inputs, wherein the process condition reference equation signal carries the simulated process condition;

evaluate a process condition approximation equation using the process control inputs and approximation coefficients to determine an approximated process condition of the process that emulates an actual process condition calculated by an industrial process transmitter that is off-line from the process control network; and produce a process condition approximation equation signal based on the approximation coefficients and the process control inputs.

18. The process control workstation of claim 17 wherein the microprocessor compares the process condition approximation equation signal to the process condition reference equation signal.

19. The process control workstation of claim 18 wherein the microprocessor is configured to store in memory values for the process condition reference equation signal and the process condition approximation equation signal, and to generate a report comparing the process condition reference equation signal and the process condition approximation equation signal.

20. The process control workstation of claim 18 wherein the microprocessor produces the approximation coefficients using a curve fitting technique or an interpolating technique that simplifies the reference equation.

21. The process control workstation of claim 20 wherein:
the reference equation comprises:

$Q_m = N C_d Y_1 E d^2 \sqrt{\rho} \sqrt{\Delta P}$, wherein:

$Q_m$=mass flow rate (mass/unit time),
N=units conversion factor (units vary),
$C_d$=discharge coefficient (dimensionless),
$Y_1$=gas expansion factor (dimensionless),
E=velocity of approach factor (dimensionless),
d=primary element throat diameter (length),
$\rho$=fluid density (mass/unit volume), and
$\Delta P$=differential pressure (force/unit area); and
the approximated reference equation comprises:

$Q_m = N [C_d][Y_1][E d^2] \sqrt{\rho} \sqrt{\Delta P}$, wherein the bracketed terms comprise an approximation of a reference equation term.

22. The process control workstation of claim 18 wherein the microprocessor adjusts the approximation coefficients to reduce a difference between the process condition approximation equation signal and the process condition reference equation signal.

23. The process control workstation of claim 22 wherein the adjusted approximation coefficients are transmitted over a process control network using the communication circuitry to process transmitter electronics; and wherein the adjusted approximation coefficients are used by the process transmitter electronics to calculate the actual process condition based on a sensed process variable and the process control input using an approximation equation.

24. The process control workstation of claim 22 wherein the microprocessor adjusts the approximation coefficients so that the process condition approximation equation signal is within a user specified accuracy of the process condition reference equation signal.

25. An industrial process control system comprising:
a process control network;
a process transmitter connected to an industrial process, the process transmitter comprising:
a sensor for measuring a process variable of the industrial process and generating a sensor signal; and
transmitter circuitry connected to the sensor to condition the sensor signal and produce a process condition signal based on a transmitter equation having transmitter coefficients and to communicate the sensor signal and the process condition signal over the process control network; and
a process control workstation disposed remotely from the process transmitter and comprising:
a digital processor connected to the process control network, the digital processor configured to produce:
a process condition reference equation signal based on a reference equation and process control inputs including simulated process conditions; and
a process condition approximation equation signal that emulates the transmitter equation and the process condition signal generated by the transmitter circuitry using the simulated process conditions and an a approximation equation including approximation coefficients.

26. The process control system of claim 25 and further comprising a user interface connected to the digital processor to enter process control inputs indicating process parameters of the control system.

27. The process control system of claim 26 and further comprising memory for storing values indicating the process condition signal, the process condition reference equation signal and the process condition approximation equation signal.

28. The process control system of claim 27 wherein the digital processor is configured to generate a report including the stored values.

29. The process control system of claim 27 wherein the digital processor of the process control workstation compares the process condition reference equation signal to the process condition signal while the process transmitter is on-line with the process control network.

30. The process control system of claim 29 wherein the process condition signal is generated using simulated sensor data provided by the digital processor.

31. The process control system of claim 27 wherein the digital processor of the process control workstation compares the process condition approximation equation signal and the process condition reference equation signal generated by the transmitter circuitry while the process transmitter is off-line with the control network.

32. The process control system of claim 31 wherein the digital processor of the process control workstation replaces the transmitter coefficients with the approximation coefficients.

33. The process control system of claim 32 wherein:
the reference equation comprises:

$Q_m = N C_d Y_1 E D^2 \sqrt{\rho} \sqrt{\Delta P}$, wherein:

$Q_m$=mass flow rate (mass/unit time),
N=units conversion factor (units vary),
$C_d$=discharge coefficient (dimensionless),
$Y_1$=gas expansion factor (dimensionless),
E=velocity of approach factor (dimensionless),
d=primary element throat diameter (length),
$\rho$=fluid density (mass/unit volume), and
$\Delta P$=differential pressure (force/unit area);
the process condition signal is generated by approximating the reference equation;
the process condition reference equation signal is generated using floating point arithmetic; and
the process condition signal is generated using integer arithmetic.

* * * * *